May 24, 1927.
G. E. FENTRESS
1,629,690
TRAVELING BLOCK
Filed June 12, 1922
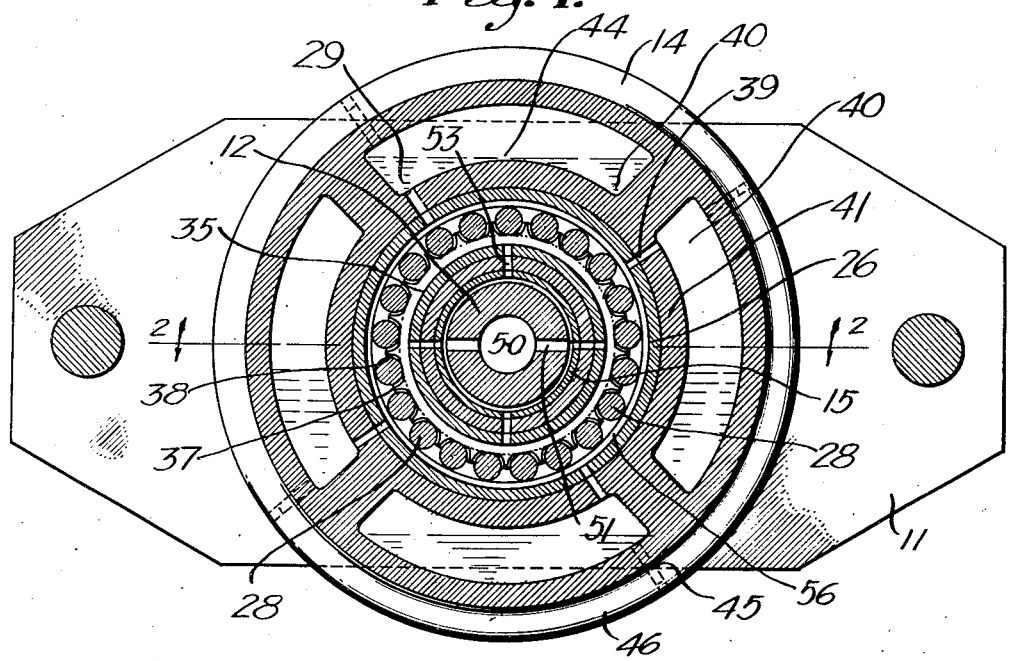
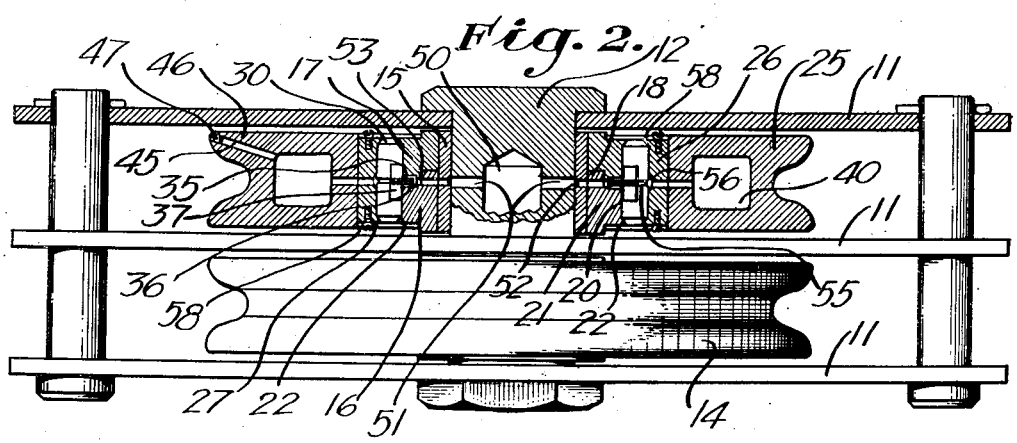
INVENTOR:
GEORGE E. FENTRESS,
BY
Graham + Harris
ATTORNEYS.

Patented May 24, 1927.

1,629,690

UNITED STATES PATENT OFFICE.

GEORGE E. FENTRESS, OF LOS ANGELES, CALIFORNIA.

TRAVELING BLOCK.

Application filed June 12, 1922. Serial No. 567,520.

My invention relates to hoisting equipment and relates particularly to pulley blocks such as are commonly used in the oil producing fields.

The traveling block now in general use with steel cable consists of cast steel sheaves supported between plates upon a supporting pin, and has hooks or clevises supported oppositely between the ends of the adjacent plates to which the ends of the cables being used may be attached. In the drilling of oil wells very severe loads are imposed upon the hoisting equipment and the blocks used therewith soon become so worn that their replacement is necessary.

It is the principal object of my invention to provide a traveling block of simple form and construction, having sheaves mounted upon steel rollers, thus eliminating the greater part of the friction now encountered in such devices, and thereby substantially increasing the wearing life of the movable parts.

It is a further object of the invention to provide an improved manner of mounting the rollers between the bearing members of the sheaves.

It is also an object to provide an improved type of roller spacing member which does not extend beyond the ends of the rollers, and therefore does not consume space beyond the ends of the rollers.

A further object of the invention is to provide an efficient lubricating system by which the rollers are kept thoroughly oiled.

Other particular advantages and further objects of the invention will be made evident hereinafter.

Referring to the drawing which is for illustrative purposes only,

Fig. 1 is a sectional view of a travelling block embodying the features of my invention, taken upon a plane passing through one of the sheaves thereof.

Fig. 2 is a side elevation of the block shown in Fig. 1, a portion thereof being in section upon a plane represented by the line 2—2 of Fig 1.

In the form of the invention shown a number of steel plates 11 of the elongated form shown in Fig. 1 have a pivot pin 12 extending centrally therethrough. Between the plates 11 and upon the pin 12 cable sheaves 14 are rotatably mounted. My invention concerns a new and improved manner of providing a substantially frictionless bearing for such rotatably mounted members, which bearing may be made of narrow width so that the width of the sheave shall not be increased by the requirements of the bearing. This bearing is constructed in the following manner:

A bronze sleeve 15 is fitted upon the exterior of the pin 12. Upon this bronze sleeve a pair of cooperating members 16 and 17 are pressed. When in position upon the sleeve 15, a projection 18 upon one of the members is adapted to rest within a recess provided in the cooperating member, thus providing a means in addition to the sleeve 15 for maintaining the alignment of the members 16 and 17. The outer face 20 of the inner bearing member thus provided by the combination of the members 16 and 17 is of true cylindrical formation and has an outwardly projecting rib 22 formed at each edge thereof as shown in Fig. 2, these ribs being preferably inwardly bevelled as also shown. A sheave casting 25 has a steel bearing ring 26 disposed therein, this member 26 being provided at its edges with inwardly projecting circular ribs 27 which are also inwardly bevelled to correspond to the ribs 22 formed upon the inner bearing member 21. Steel rollers 28 are placed between the inner member 21 and the outer member 26, these rollers having the ends thereof bevelled as shown at 30. The ribs 22 and 27 extend over the bevelled end of the rollers 28 and thereby provide an engagement between the rollers and the bearing members which prevents the outer member from sliding sidewise with relation to the inner member, so that an alignment of the parts is thus preserved.

My invention also provides a novel form of spacing means for maintaining the rollers in their proper positions of separation. This spacing means may comprise a ring 35 which rests in a circular groove 36 formed between the inner faces of the members 16 and 17. Extending outwardly from the ring 35 are projections 37 which extend between the rollers 28 and from which projections wings 38 having a cylindrical contour to correspond to the surface of the rollers extend. It will be perceived that the spacer provided does not require or consume space which would add to the width of the bearing member, its use is thus consistent with the maintenance a narrow width of bearing which is necessary in sheaves adapted to be used in the block described.

Another feature of the invention resides in the manner in which I attain an ample lubrication of the bearing. Segmental chambers 40 are cast within the sheave 25 and holes 39 are provided through the inner web 41 of the sheave and the outer bearing member 26, through which oil may pass between the bearing surfaces and the chambers. These holes 39 are shown as situated at the extreme end of each of the chambers so that an oil passage will communicate at the lowest point in one of the chambers 40 no matter what the position of the sheave may be. If these holes 39 were placed at the position 44 indicated in Fig. 1, there could be a quantity of oil 29 resting in the chambers 40 which could not reach the bearing, while with the holes 39 in the position shown a flow of oil from one of the chambers to the bearing surfaces is accomplished as long as oil remains in these reservoirs. Filling holes 45 are shown as drilled through the flanges 46 of the sheaves through which the chambers 40 may be initially filled with oil, plugs 47 being provided to close the holes 45 after the chambers 40 have been filled. A central oil reservoir 50 is shown as also provided in the pin 12; and radial holes 51 may extend outwardly from this reservoir 50, connecting with a groove 52 cut in the inner side of the bushing 15. Through the bushing 15 and through the inner bearing member 21 radial grooves 53 connect with the bearing surface of the inner bearing member so that oil placed in the reservoir 50 will be distributed to the surfaces of the bearing members. It is also desirable to cut circular grooves 55 in each of the rollers 50 so that oil may pass freely to the groove 56 provided in the outer bearing member 26, this groove being in communication with the holes 39 which lead into the oil chambers 40. Further, side plates 58 may be provided for the purpose of retaining the oil within the space between the inner and outer bearing members in which the rollers 17 are disposed.

It will be perceived that the centrifugal action which is in effect when the sheave 40 is in rotation causes the oil to travel outwardly through the holes 39 into the oil chamber and that when the sheave is stopped momentarily, a gravity flow of oil from several of the oil chambers to the bearing occurs, filling the spaces between the rollers 17. This continual interchange of oil between the reservoirs 40 and the bearing provides a very efficient lubrication which materially contributes to the life of the bearing.

I claim as my invention:

1. In a bearing of the class described, the combination of: inner and outer members presenting cooperating cylindrical faces, one of said members comprising parts, of equal radial thickness, which so interfit as to leave therebetween circular channels formed in the cylindrical face thereof; rollers between said cylindrical faces; and a central ring disposed in said channel and having projections arranged to extend between and to separate said rollers; and means for feeding a lubricant, under centrifugal force, toward said channel, said outer member being provided with a plurality of segmental chambers; and the walls of said chambers being provided with outwardly and inwardly extending holes at one end thereof.

2. In a bearing of the class described, the combination of: inner and outer members presenting cooperating cylindrical faces, one of said members having a circular channel formed in the cylindrical face thereof and being divided on a plane passing through said channel; rollers between said cylindrical faces; a central ring disposed in said channel and having projections arranged to extend between and to separate said rollers; and means for delivering a lubricant, through a plurality of passages radially toward said rollers, said outer member being provided with a plurality of segmental chambers; and the walls of said chambers being provided with outwardly and inwardly extending holes at one end thereof.

3. In a bearing of the class described, the combination of: a separable inner member which comprises cooperating elements of equal radial thickness; a sleeve surrounding a central pin and upon which said inner member is held in position; an outer member; rollers between said members; and means engaging the outer faces of said members, to prevent escape of any lubricant provided for said rollers, said outer member being provided with a plurality of segmental chambers; and the walls of said chambers being provided with outwardly and inwardly extending holes at one end thereof.

4. A bearing as in claim 3 in which said inner member comprises two parts both contacting with said sleeve, one having a recess and the other having a projection which may cooperate to align said parts, said outer member being provided with a plurality of segmental chambers; and the walls of said chambers being provided with outwardly and inwardly extending holes at one end thereof.

5. In a bearing of the character set forth in claim 3, means for separating said rollers; means for feeding a lubricant inwardly and outwardly thereto; and means for preventing escape of said lubricant; said outer member being provided with a plurality of segmental chambers; and the walls of said chambers being provided with outwardly and inwardly extending holes at one end thereof.

6. In a bearing of the character set forth in claim 3, separating means for said rollers comprising a ring member disposed in a channel in said inner member and having outward projections into a space to which lubricants are fed under the action of gravity, said outer member being provided with a plurality of segmental chambers; and the walls of said chambers being provided with outwardly and inwardly extending holes at one end thereof.

In testimony whereof, I have hereunto set my hand at Los Angeles, California, this 5th day of June, 1922.

GEORGE E. FENTRESS.